US012032680B2

(12) United States Patent
Atamli et al.

(10) Patent No.: US 12,032,680 B2
(45) Date of Patent: Jul. 9, 2024

(54) PRESERVING CONFIDENTIALITY OF TENANTS IN CLOUD ENVIRONMENT WHEN DEPLOYING SECURITY SERVICES

(71) Applicant: Mellanox Technologies, Ltd., Yokneam (IL)

(72) Inventors: Ahmad Atamli, Oxford (GB); Rami Ailabouni, North District (IL); Ahmad Saleh, Nazareth (IL); Ariel Levanon, Givat Shmuel (IL); Thanh Nguyen, Huntsville, AL (US); Mark Overby, Snohomish, WA (US)

(73) Assignee: Mellanox Technologies, Ltd., Yokneam (IL)

( * ) Notice: Subject to any disclaimer, the term of this patent is extended or adjusted under 35 U.S.C. 154(b) by 266 days.

(21) Appl. No.: 17/709,815

(22) Filed: Mar. 31, 2022

(65) Prior Publication Data

US 2023/0297666 A1    Sep. 21, 2023

Related U.S. Application Data

(60) Provisional application No. 63/321,410, filed on Mar. 18, 2022.

(51) Int. Cl.
*G06F 21/53* (2013.01)
*G06F 21/60* (2013.01)

(52) U.S. Cl.
CPC ............ *G06F 21/53* (2013.01); *G06F 21/606* (2013.01); *G06F 2221/033* (2013.01)

(58) Field of Classification Search
CPC ... G06F 21/53; G06F 21/606; G06F 2221/033
USPC ......................................... 726/22, 23, 24, 25
See application file for complete search history.

(56) References Cited

U.S. PATENT DOCUMENTS

| | | | |
|---|---|---|---|
| 10,341,345 B1 * | 7/2019 | Johansson | H04L 63/12 |
| 2011/0282941 A1 * | 11/2011 | Chan | G06Q 10/06 |
| | | | 709/204 |
| 2017/0286278 A1 * | 10/2017 | Thomas | G06F 21/52 |
| 2022/0014923 A1 * | 1/2022 | Banjade | H04W 4/029 |
| 2022/0066809 A1 * | 3/2022 | Liu | G06F 9/45558 |
| 2023/0026671 A1 * | 1/2023 | Seed | H04W 36/32 |
| 2023/0106581 A1 * | 4/2023 | Sood | H04L 63/166 |
| | | | 709/203 |

* cited by examiner

*Primary Examiner* — Teshome Hailu
(74) *Attorney, Agent, or Firm* — Lowenstein Sandler LLP (57) ABSTRACT

The technology disclosed herein enables an auxiliary device to run a service that can access and analyze data of a Trusted Execution Environment (TEE). The auxiliary device may establish an auxiliary TEE in the auxiliary device and establish a trusted communication link between the auxiliary TEE and the TEE (i.e., primary TEE). The primary TEE may execute a target program using the primary devices of a host device (e.g., CPU) and the auxiliary TEE may execute a security program using the auxiliary device (e.g., DPU). In one example, the primary and auxiliary TEEs may be established for a cloud consumer and the auxiliary TEE may execute a security service that can monitor data of the primary TEE even though the data is inaccessible to all other software executing external to the primary TEE (e.g., inaccessible to host operating system and hypervisor).

18 Claims, 6 Drawing Sheets

PRESERVING CONFIDENTIALITY OF TENANTS IN CLOUD ENVIRONMENT WHEN DEPLOYING SECURITY SERVICES

RELATED APPLICATIONS

This application claims the benefit of U.S. Provisional Patent Application No. 63/321,410 filed Mar. 18, 2022, entitled "PRESERVING CONFIDENTIALITY OF TENANTS IN CLOUD ENVIRONMENT WHEN DEPLOYING SECURITY SERVICES," which is incorporated by reference herein.

TECHNICAL FIELD

The present disclosure generally relates to using confidential computing techniques to establish a trusted computing base within a host device, and more specifically relates to expanding the trusted computing base to include hardware accelerators that provide security services and monitor portions of the confidential computing environment.

BACKGROUND

Modern computer systems often use confidential computing to enhance data security. Data security typically involves encrypting data when the data is stored on disk and when the data is in transit and with confidential computing the data is also encrypted while the data is in-use (e.g., stored in memory or processor cache). Confidential computing may also supplement the encryption with integrity verification, replay protection, or a combination thereof.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern computing environments often use aspects of confidential computing to establish trust relationships with a portion of a host device. The trust relationship may be between different devices and programs and may involve one or more integrity checks. The portion of the host device that is trusted may be referred to as the trusted computing base (TCB) and may include both hardware and software of the host device. In one example, the trust relationship may be established using a Trusted Execution Environment (TEE).

The trusted execution environment may be implemented at a hardware level using the primary devices of a host device, which include the Central Processing Unit (CPU) and host memory. The CPU can provide hardware-level encryption that isolates the data of a process from being accessed by the operating system that manages the process. In computer systems that use hardware level virtualization, an entire virtual machine (VM) can be executed in a trusted execution environment and the data of the virtual machine that is stored in main memory can remain isolated from the hypervisor and host operating system that manage the virtual machine. Most trusted execution environments are primary trusted execution environments that are established using the primary devices of the host device and may not extend to auxiliary devices that provide hardware acceleration. This may cause the auxiliary devices to be unable to access the data that is being isolated by the primary trusted execution environment.

The isolation provided by a trusted execution environment may be problematic for services that are responsible for observing the execution of a computing environment. The services may observe the execution of target programs to ensure they are compliant with one or more rules. The services often run in the background and minimize requests sent to the program to reduce introducing a load on the program. The services may instead access data of the target program from other sources, such as from host memory or system bus. By running the target program in the trusted execution environment, the service may no longer have access to data of the program and be unable to function as intended, which may adversely affect the computing environment.

Aspects of the present disclosure address the above and other deficiencies by providing technology that enables a trusted execution environment to be extended to include an auxiliary device so that the auxiliary device can run services that analyze data of the trusted execution environment. Extending the trusted execution environment (e.g., primary TEE) to the auxiliary device may involve establishing an auxiliary TEE in the auxiliary device and a trusted communication link between the auxiliary TEE and a primary TEE. The primary TEE may include the computing resources of the primary devices of a host device (e.g., CPU and host memory) and the auxiliary TEE may include the computing resources of the auxiliary devices (e.g., hardware accelerators and auxiliary memory). The trusted communication link may enable a program executed by the auxiliary TEE (e.g., security service) to access data of the primary TEE, which would otherwise be inaccessible to all software executing external to the primary TEE (e.g., host operating system and hypervisor). The auxiliary device may use the auxiliary TEE to access the data without compromising the security enhancements provided by the primary TEE.

In one example, the auxiliary device may execute one or more programs that analyze the data of the primary TEE and perform one or more services. The services may involve data processing and may be the same or similar to security services, monitoring services, tracking services, configuration services, performance services, other services, or a combination thereof. The auxiliary device may be associated with a host device and may replace or supplement data processing performed by the CPU of the host device. In one example, the auxiliary device may be a Data Processing Unit (DPU) that accesses data that is in-use by the primary TEE and processes the data using one or more hardware accelerators. In this example, the primary TEE may be referred to as a CPU-TEE and the auxiliary TEE may be referred to as a DPU-TEE.

The technology described herein improves the field of computer security by enabling a host device in a Confidential Computing environment (e.g., Trusted Computing environment) to provide better performance and security. In particular, aspects of the disclosed technology may increase the performance of the host device by enabling a host device to offload data processing tasks in a security enhanced manner from a primary device (e.g., CPU) to one or more auxiliary devices (e.g., DPUs, GPUs, NICs, or other hardware accelerators). This may also enhance security because the services may run out of band on the auxiliary device and may be undetected or may be undetectable by any host programs, which may include the target program, the host operating system, hypervisor, container runtime, other programs executed by CPU, or a combination thereof. This may be particular advantageous for protecting devices against malware because the malware running on the host device may be unable to detect that there is a security service running and may not attempt to alter its behavior.

In addition, aspects of the disclosed technology may also or alternatively enable the operation of the auxiliary device to be customized by a user device. The customizations may involve updating settings, configurations, executable code, other data or a combination thereof. This may be particularly advantageous in a cloud computing environment where a cloud consumer may want data of programs (e.g., workload) to be inaccessible to the Cloud Service Provider (CSP). With this technology the cloud consumer may be able to provide the programs executing on the primary devices (e.g., CPUs) and the auxiliary devices (e.g., DPUs, GPUs, or NIC) and enhance confidentiality, integrity, or a combination thereof.

Various aspects of the above referenced methods and systems are described in details herein below by way of examples, rather than by way of limitation. The examples provided below discuss a computing environment that uses a combination of confidential computing and hardware level virtualization and executes virtual machines in trusted execution environments. In other examples, the confidential computing features and trusted execution environments may be substituted with different techniques for enhancing confidentiality or integrity verification. In yet another example, the host device may be absent hardware level virtualization or include an alternate or an additional virtualized execution environment, such as container-based virtualization (e.g., operating system level virtualization).

Figure 1:
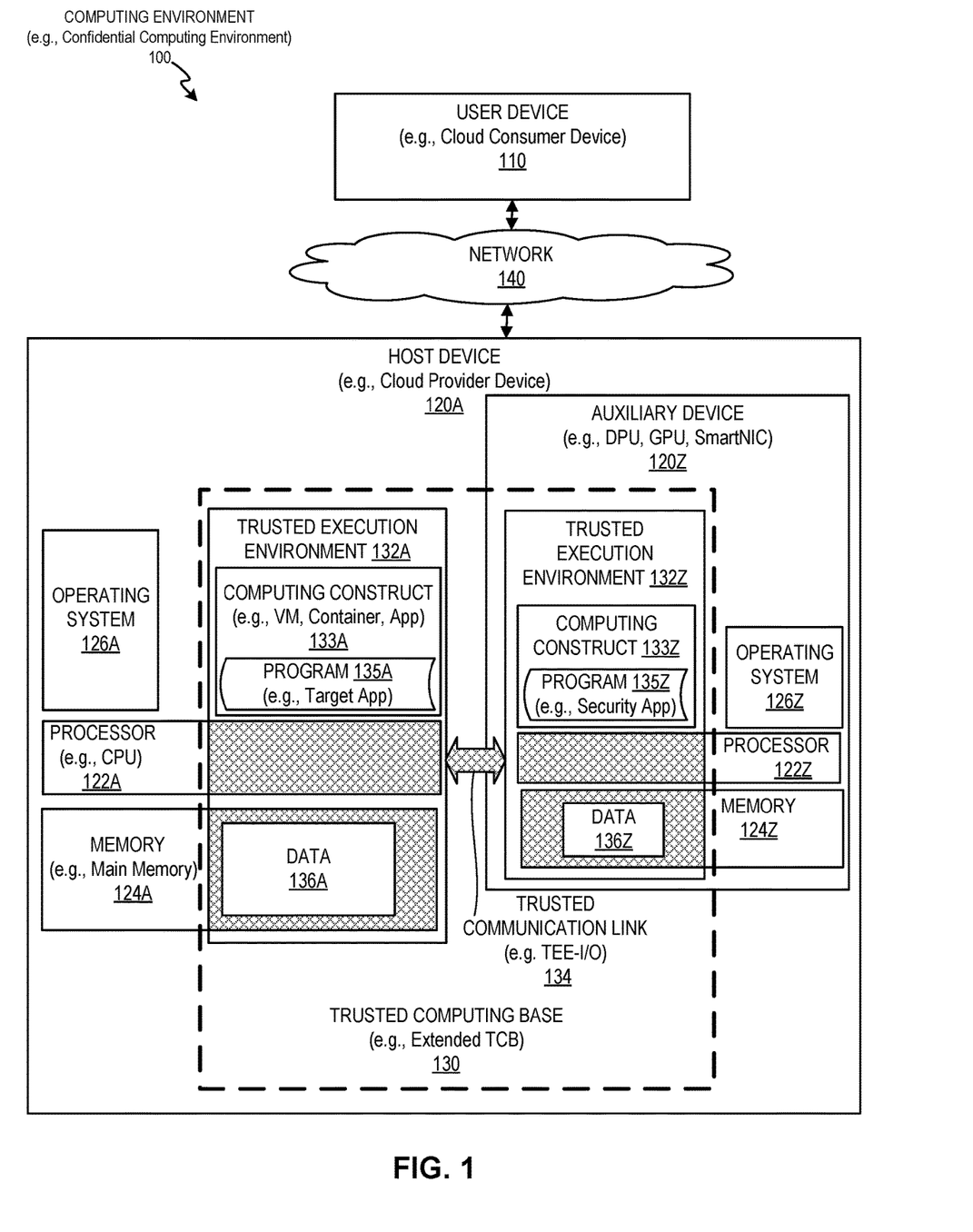
FIG. 1 depicts a high-level block diagram of an example computing environment that uses an auxiliary device to access and analyze portions of a confidential computing environment, in accordance with one or more aspects of the present disclosure.

FIG. 1 depicts an illustrative architecture of elements of a computing environment 100, in accordance with an example of the present disclosure. It should be noted that other architectures for computing environment 100 are possible, and that the implementation of a computing environment utilizing embodiments of the disclosure are not necessarily limited to the specific architecture depicted. Computing environment 100 may be a computing environment that is configured to provide on-demand availability of computing resources to consumers without direct management by the consumers. In one example, computing environment 100 may be a cloud computing environment (e.g., public cloud, private cloud, hybrid cloud) and the user devices and host devices may be associated with different entities (e.g., cloud consumer v. cloud provider). In another example, computing environment 100 may be an on-premise computing environment in which the user devices and host devices are associated with the same entity (e.g., same company, enterprise, or business entity). In the simplified example of FIG. 1, computing environment 100 may include a user device 110, a host device 120A, an auxiliary device 120Z, a trusted computing base 130, and a network 140.

User device 110 may be any computing device that consumes the computing resources of host device 120A and may provide input data (e.g., code or configurations) that enable the host device 120A to execute computing tasks on behalf of user device 110. User device 110 may include one or more servers, workstations, desktop computers, laptop computers, tablet computers, mobile phones, robotic devices (e.g., drones, autonomous vehicles), personal digital assistants (PDAs), smart watches, other device, or a combination thereof.

Host device 120A may be a single host machine or multiple host machines arranged in a heterogeneous or homogenous group (e.g., cluster). In one example, host device 120A may be or include one more servers, workstations, personal computers (e.g., desktop computers, laptop computers), mobile computers (e.g., mobile phones, palm-sized computing devices, tablet computers, personal digital assistants (PDAs)), data storage devices (e.g., USB drive, Network Attached Storage (NAS), Storage Area Network (SAN)), network devices (e.g., routers, switches, access points), other devices, or a combination thereof.

Host device 120A may include multiple primary devices that include one or more processors 122A and memory 124A. Processor 122A may be or include a Central Processing Unit (CPU) and may be referred to as the primary processor, host processor, main processor, other term, or a combination thereof. Processor 122A may have an Instruction Set Architecture (ISA) that is the same or similar to x86, ARM, Power ISA, RISC-V, SPARC, MIPS, other architecture, or a combination thereof. Processor 122A may be coupled to memory 124A and memory 124A may be shared by one or more devices of host device 120A. Memory 124A may be referred to as main memory, host memory, primary memory, other term, or a combination thereof. Host device 120A may include or be associated with one or more auxiliary devices 120Z.

An auxiliary device 120Z may be a computing device that is communicably coupled with host device 120A and may perform one or more data processing tasks for host device 120A. Auxiliary device 120Z may be internal or external to host device 120A and may be a peripheral device (e.g., PCIe device) in the form of a physical adapter, card, component, module, or other device that is physically located on the same chassis as host device 120A (e.g., same board, case, tower, rack, cabinet, room, building) or on a different chassis. Auxiliary device 120Z may perform data processing tasks that are the same or similar to the data processing tasks performed by processor 122A or may perform data processing tasks that are not performed by processor 122A. Auxiliary device 120Z may perform the data processing tasks using processor 122Z and memory 124Z.

Processor 122Z may supplement the data processing functions of the primary processor 122A and be referred to as an auxiliary processor, coprocessor, other term, or a combination thereof. In one example, processor 122Z may be similar to processor 122A and may operate as a Central Processing Unit (CPU) of auxiliary device 120Z. The instruction set architecture of processor 122Z may be the same or different from the instruction set architecture of processor 122A and may be the same or similar to ARM, RISC-V, Power ISA, x86, other standardized or proprietary ISA, or a combination thereof. In another example, processor 122Z may be or include one or more Application Specific Integrated Circuits (ASICs), Field Programmable Gate Arrays (FPGAs), microprocessors, controllers, other processing devices, or a combination thereof. In either example, processor 122Z may include or manage one or more hardware accelerators and use memory 124Z to store data.

Memory 124Z may be coupled with processor 122Z of auxiliary device 120Z and may be referred to as auxiliary memory, device memory, other term, or a combination thereof. In one example, memory 124Z may be separate from memory 124A and may be exclusive to auxiliary device 120Z. In another example, memory 124Z may be a portion of memory 124A. Memory 124A-Z and processors 122A-Z are discussed in more detail in regards to FIG. 3.

Auxiliary device 120Z may be the same or similar to a Data Processing Unit (DPU) in one example. The data processing unit may contain one or more central processing devices (e.g., CPUs, ASICs, FPGAs), network controllers (e.g., NICs), programmable data acceleration engines (e.g., encryption engine, analysis engine, or other engine), other computing resources, or a combination thereof. The data processing unit may have the generality and the programmability of a more traditional CPU while being specialized to operate more efficiently for data processing tasks that involve cryptographic operations (e.g., encryption, hashing), analysis operations (e.g., comparing hashes), storage operations (e.g., write/read requests), networking operations (e.g., deep packet inspection), memory operations (e.g., store/access requests), or a combination thereof.

In one example, the DPU may be different from a traditional CPU and a traditional GPU. The DPU may be different from a traditional CPU because there may be a larger degree of parallelism and may differ from a traditional GPU because it may use Multiple Instruction, Multiple Data (MIMD) architecture rather than a Single Instruction/Multiple Data (SIND) architecture. The MIMD architecture may be a hardware architecture that provides a set of processing cores that function asynchronously and independently. At any time, different processing cores may be executing different instructions on different pieces of data. The processing cores may access memory using a bus, mesh, hypercube, or hierarchical access technique.

In other embodiments, auxiliary device 120Z may be or include one or more Infrastructure Processing Units (IPU), Smart Network Interface Controller (NIC), Tensor Processing Unit (TPU), Graphical Processing Units (GPUs), other data processing device, or a combination thereof. The hardware and programming of host device 120A and auxiliary device 120Z may support confidential computing and can be used to establish a trusted computing base 130.

Trusted Computing Base (TCB) 130 may be the portion of a computing environment 100 that is trusted by a particular computing resource. The particular computing resource may be a program or device that is internal to computing environment 100, external to computing environment 100, or a combination thereof. The particular computing resource may be referred to as the trusting resource because it trusts the trusted resource. The trusting resource may establish a trust relationship with the trusted resource by verifying the trusted resource. The process of verifying the trusted resource is discussed in more detail in regards to FIG. 4 (e.g., attestation).

The trusted resource may be a set of computing resources of host device 120A, auxiliary device 120Z, other device, or a combination thereof. The set of computing resources may include portions of hardware resources (e.g., hardware interfaces, processors, interconnects, memory, or other integrated circuits), portions of software resources (e.g., programming interfaces, programs, firmware, drivers, services, kernels, operating systems, applications, or other executable code), or a combination thereof. After the trusted computing base is established, it can be modified to extend (e.g., expand) or retract (e.g., shrink) the set of trusted computing resources. In the example illustrated in FIG. 1, trusted computing base 130 may initially include the computing resources of trusted execution environment 132A (e.g., primary processor and main memory) and trusted computing base 130 may be extended to include trusted communication link 134 and trusted execution environment 132Z (e.g., auxiliary processor and memory).

Trusted execution environments 132A-Z (TEEs) may each enable confidential computing by including a set of computing resources that are configured to protect data using techniques that enhance data confidentiality, data integrity, or a combination thereof. Trusted execution environments 132A-Z may protect data using hardware based encryption that isolates the data of one or more computing processes (e.g., application, container, VM) from other processes running on the same device. In one example, the data of a process executing in the trusted execution environment may be encrypted using cryptographic keys that are accessible to a hardware processor of the device but are inaccessible to all the processes running on the device (e.g., hardware level encryption). The hardware processor may encrypt or decrypt the data of the process executing in the trusted execution environment when the process stores or accesses the data in memory. This enables the trusted execution environment to isolate data of a lower privileged process (e.g., virtual machine process) executing within the trusted execution environment from being accessed by a higher privileged processes (e.g., hypervisor or host OS) even though the higher privileged processes may be responsible for managing the lower privileged process. A trusted execution environment may provide code execution, storage confidentiality, and integrity protection, and may store, execute, and isolate data as discussed in more detail in regards to FIG. 3.

Trusted execution environment 132A and 132Z may each correspond to a different set of computing resources (e.g., sub-set of trusted computing base 130). In the example illustrated in FIG. 1, trusted execution environment 132A may have a set of computing resources that includes the primary device of host device 120A, such as a portion of processor 122A (e.g., host processor) and a portion of memory 124A (e.g., main memory). Trusted execution environment 132A may be referred to as the primary TEE, host TEE, main TEE, CPU-TEE, other term, or a combination thereof. Trusted execution environment 132Z may have a set of computing resources of auxiliary device 120Z and the set may include a portion of processor 122Z (e.g., auxiliary processor) and a portion of memory 124Z (e.g., auxiliary memory). Trusted execution environment 132Z may be referred to as the auxiliary TEE, device TEE, DPU-TEE, other term, or a combination thereof. Trusted execution environments 132A-Z may use the computing resources to execute programs 135A-Z.

Programs 135A-Z may be any computer program that includes code that can be executed within a trusted execution environment. Program 135A may be any program or combination of programs and may execute as one or more processes and be referred to as a target program (e.g., target process), monitored program (e.g., monitored process), observed program (e.g., observed process), other term, or a combination thereof. Program 135Z may be any program or combination of programs that can access data of the target program and may be a program that provides a security service, observability service, monitoring service, performance service, proxy service, or a combination thereof. As illustrated in FIG. 1, program 135A may execute within primary TEE 132A using the primary devices of host device 120A (e.g., processor 122A) and program 135Z may execute within auxiliary TEE 132Z using auxiliary device 120Z (e.g., processor 122Z).

Programs 135A-Z may be provided by user device 120, host device 120A, auxiliary device 120Z, other device, or a combination thereof. In one example, program 135A may be provided by user device 120 (e.g., cloud consumer) and program 135Z may be provided by host device 120A (e.g., cloud provider) or auxiliary device 120Z (e.g., hardware designer, manufacturer, or distributor). In another example, program 135A and program 135Z may both be provided by user device 120 (e.g., cloud consumer). In either example, user device 120 may be capable of verifying the integrity of programs 135A-Z before execution and program 135Z can be used to analyze program 135A during execution to determine whether the execution of program 135A has or has not been compromised.

The execution of program 135A may be compromised when any aspect of primary TEE 132A has been affected by an unauthorized operation. The operation may access or change data and may be unauthorized when it is made without permission and may be done maliciously, accidentally, intentionally, other manner, or a combination thereof. The unauthorized change may involve the addition, removal, replacement, substitution, movement, or other update to executable data (e.g., executable code), non-executable data (e.g., information, metadata), or a combination thereof. The change may affect data 136, program 135A, primary TEE 132A, computing construct 133A, or combination thereof. Examples of unauthorized changes may be or include one or more changes to executable code (e.g., add malware, replace library), configurations (e.g., disable encryption, disable integrity checking), environment variables (e.g., change execution path), permissions (e.g., change storage object permissions), privileges (e.g., privilege escalation), account (e.g., add user to admin group), change source or destination of data (e.g., spoofing source, replacing destination), other change, or a combination thereof.

Trusted communication link 134 may enable trusted execution environments 132A-Z to be communicatively coupled so that the data of a trusted execution environment can be transmitted between trusted execution environments in a security enhanced manner. For example, trusted communication link 134 may enable data 136A of primary trusted execution environment 132A to be accessed by auxiliary trusted execution environment 132Z and stored as data 136Z within the auxiliary trusted execution environment 132Z. Communicatively coupling trusted execution environments may generate a composite trusted execution environment. The composite trusted execution environment (e.g., aggregate TEE, composite TEE) may occur when TEEs of different processors or different types of processors (e.g., CPU-TEE and DPU-TEE) are coupled using trusted communication link 134.

Trusted communication link 134 may include or traverse one or more interconnects, buses, networks, other communication link, or a combination thereof. Data transmitted over trusted communication link 134 may be encrypted or partially encrypted during transit. This may be advantageous because transmitting data 136A in an encrypted form may limit the ability of data 136A to be snooped while being transmitted between computing resources of different trusted execution environments (e.g., between processor 122A and processor 122Z).

Transmitting data between trusted execution environments 132A and 132Z may involve one or more changes to the data encryption being used. In one example, the data may be encrypted using a first cryptographic technique (e.g., a first key) when stored in memory 124A, a second cryptographic technique when transmitted over trusted communication link 134 (e.g., a second key), and a third cryptographic technique when stored in memory 124Z (e.g., a third key). When switching between cryptographic techniques the data may be decrypted and then encrypted. In another example, the data that is stored in memory 124A may be encrypted using a cryptographic technique that is available to both trusted execution environments and can be accessed without changing the encryption. The establishment and use of trusted communication link 134 is discussed in more detail in regards to FIGS. 2 and 3 (e.g., TEE-IO).

Trusted execution environments 132A-Z can each have the same or different levels of granularity and protect a respective computing construct 133A-Z. The level of granularity of a TEE can depend on the computing construct that is being protected and can be a Virtual Machine (VM), a container, a process, a thread, other stream of execution, or a combination thereof. A trusted execution environment for executing and protecting a VM may be referred to as Trusted Virtual Machine (TVM). A trusted execution environment for executing and protecting a container may be referred to as a Trusted Container (TC). A trusted execution environment for executing and protecting an application process may be referred to as a Trusted Application (TA) or Trusted Process (TP). In one example, trusted execution environment 132A may be established by host processor 122A and include a virtual machine or container and trusted execution environment 132Z may be established by auxiliary processor 122Z and be a TEE for one or more processes (e.g., a security service or proxy service).

Computing environment 100 may include computing devices (e.g., 110, 120A, 120Z) that support one or more levels of virtualization. The levels of visualization may include hardware level virtualization (e.g., VMs), operating system level virtualization (e.g., containers), other virtualization, or a combination thereof. Hardware level virtualization may involve the computing device (e.g., 120A, 120Z) running an operating system (e.g., 120A, 120Z) that supports a hypervisor (e.g., Virtual Machine Monitor (VMM)). The hypervisor may provide and manage hardware resources for use by one or more virtual machines. The hypervisor may be any program or combination of programs and may run on a host operating system or may run directly on the hardware (e.g., bare-metal hypervisor). The hypervisor may manage and monitor various aspects of the operation of the computing device, including the storage, memory, and network interfaces. The hypervisor may abstract the physical layer features such as processors, memory, and I/O devices, and present this abstraction as virtual devices to a virtual machine. In one example, the hypervisor may be the same or similar to Microsoft® Hypervisor (e.g., Hyper-V™), Open Source Software Hypervisor (e.g., Kernel-Based Virtual Machine (KVM)), VMware™ Hypervisor (e.g., ESX/ESXi, VMware Workstation, VMware Player, VirtualBox), IBM™ Hypervisor (e.g., PowerVM Hypervisor™), Citrix™ Hypervisor (e.g., Xen™, Citrix Hypervisor™, XenServer™), Oracle Hypervisor (e.g., VM Server for SPARC or x86), Parallels Desktop, Virtuozzo, other hypervisor, or a combination thereof.

Operating system virtualization may be used with or without hardware level virtualization and may provide computing resources to one or more containers. Operating system level virtualization may be implemented within a kernel of operating system and may enable the existence of multiple isolated containers. In one example, operating system level virtualization may not require hardware support and may impose little to no overhead because programs within each of the containers may use the system calls of the same underlying operating system. This may enable host device 120A to provide virtualization without the need to provide hardware emulation or be run in an intermediate virtual machine as may occur with hardware level virtualization.

Each container may be a resource-constrained process space of the computing device (e.g., host device 120A) that can execute functionality of a program. A container may appear to a user as a standalone instance of the user space of operating system and may be referred to as a user-space instance, a virtualization engine (VE), a jail, or other term. Each container may share the same kernel but may be constrained to use only a defined set of computing resources (e.g., CPU, memory, I/O). In one example, operating system virtualization may be provided by an operating system virtualizer that wraps an application in a complete file system that contains the code, runtime, system tools, system libraries, and other programs that can be used by the application. The operating system virtualizer may be the same or similar to Docker®, ThinApp® by VMWare®, Solaris Zones® by Oracle®, or other program that automates the packaging, deployment, and execution of applications inside containers.

Network 140 may include one or more public networks (e.g., the internet), private networks (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the computer network 140 and/or a wireless carrier system that can be implemented using various data processing equipment, communication towers, etc.

Figure 2:
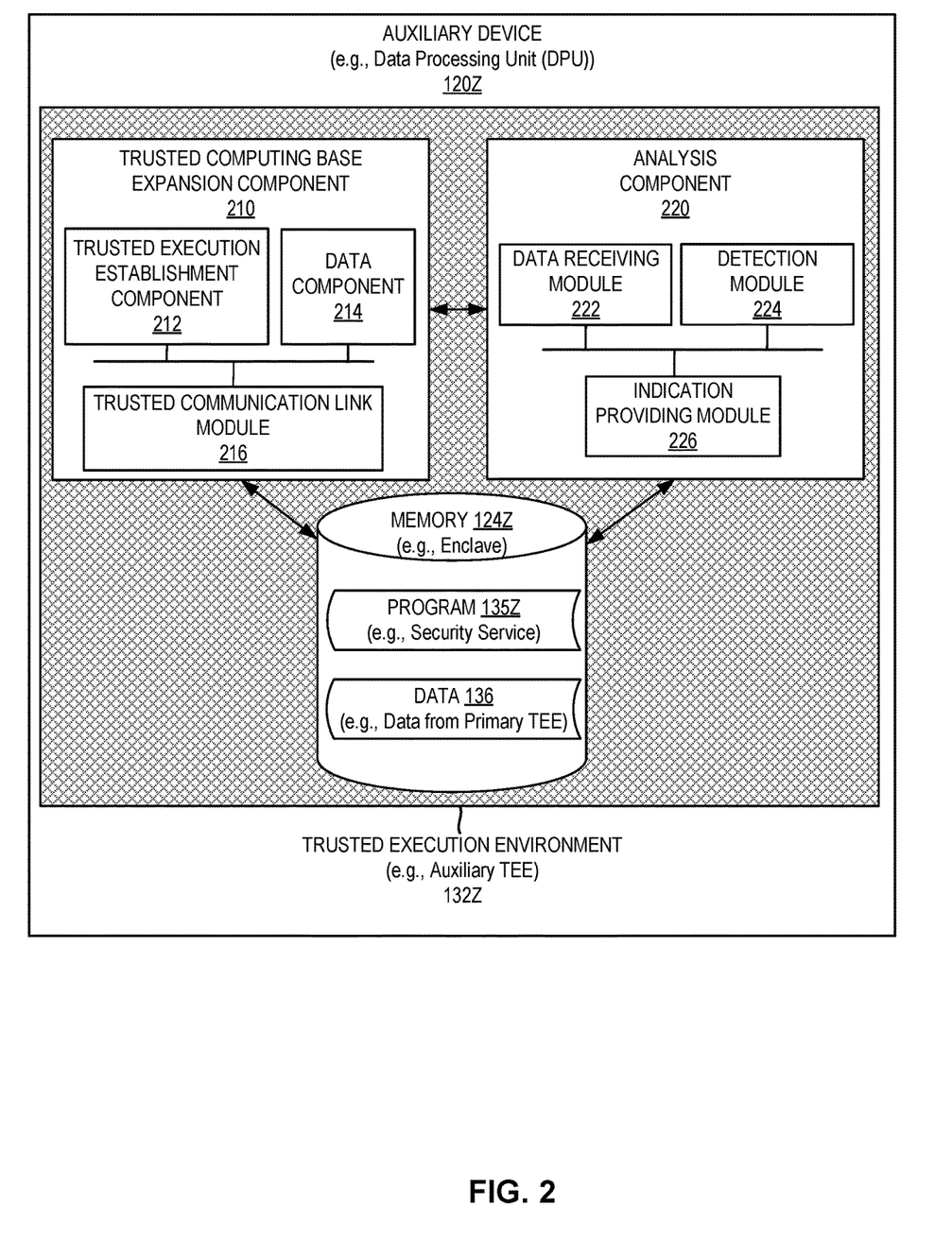
FIG. 2 depicts a block diagram of an example auxiliary device that uses a trusted execution environment to access and analyze other portions of the confidential computing environment, in accordance with one or more aspects of the present disclosure.

FIG. 2 depicts a block diagram illustrating an example auxiliary device 120Z that may access and analyze data of a primary TEE, in accordance with one or more aspects of the present disclosure. In the example illustrated, auxiliary device 120Z may include a trusted computing base expansion component 210 and a data analysis component 220.

Trusted computing base expansion component 210 may enable auxiliary device 120Z to expand the trusted computing base of host device 120A to include computing resources of auxiliary device 120Z. The expansion may involve adding one or more trusted execution environments, trusted communication links, trusted interfaces, other computing resource, or a combination thereof. In the example illustrated, trusted computing base expansion component 210 may include trusted execution establishment component 212, data component 214, and a trusted communication link module 216.

Trusted execution establishment component 212 and data component 214 may enable auxiliary device 120Z to establish one or more trusted execution environments (e.g., auxiliary TEE 132Z) that include computing resources of auxiliary device 120. Components 212 and 214 may perform attestation, initiation, configuration, loading, and execution for the one or more auxiliary TEEs as discussed in detail below in regards to FIG. 4.

Trusted communication link module 216 may enable auxiliary device 120Z to establish a trusted communication link with a primary TEE executing on host device 120. In one example, the trusted communication link may be based on a Trusted Execution Environment Input/Output (TEE-I/O, TEE IO) architecture. The TEE IO architecture may be a form of trusted IO virtualization that can connect any TEE (e.g., primary TEE or auxiliary TEE) with a target computing resource of a device that is external to the TEE. The TEE may be associated with a TEE Security Manager (TSM) and the target computing resource may be associated with a Device Security Manager (DSM). The TSM and DSM may communicate to establish trusted communication link between the TEE and the target computing resources. The target computing resource may be a particular device interface such as an Assignable Device Interface (ADI), Virtual Function (VF), Physical Function (PF), other portion of the device, or a combination thereof. The communication between the TSM and DSM may comply with a Device Interface Management Protocol (DIMP) and involve sending one or more requests and responses that are used to manage the assignment or removal of the target computing resource (e.g., device interface) to the TEE. In one example, the trusted communication link may be established over a Peripheral Computer Interface Express (PCIe) connection and may use Integrity and Data Encryption (IDE) stream to transmit data using Transaction Layer Packets (TLPs) between multiple PCIe ports. In one example, the multiple PCIe ports may include at least one port associated with the TEE (e.g., port of processor 122A) and at least one port associated with the auxiliary device (e.g., port of processor 122Z)

Trusted communication link module 216 may use one or more trusted communication links to communicably couple the primary TEE and the auxiliary TEE. In one example, a single trusted communication link can be used to communicably couple the primary TEE and auxiliary TEE. The single trusted communication link may be between the primary TEE and one of the devices of auxiliary device 120Z (e.g., auxiliary processor or auxiliary memory), between the auxiliary TEE and one of the primary devices (e.g., host processor or host memory), or a combination thereof. In another example, a set of multiple trusted communication links may be used to communicably couple the primary TEE and auxiliary TEE. The set of trusted communication links may include a link between the primary TEE and an intermediate computing resource (e.g., device interface) and a link between the intermediate computing resource and the auxiliary TEE. In either example, the one or more trusted communication links can be initiated by the primary processor, auxiliary processor, primary TEE, auxiliary TEE, other computing resource, or a combination thereof.

Analysis component 220 may enable auxiliary device 120Z to access and analyze data of the primary TEE. Data analysis component 220 may include a data receiving module 222, a detection module 224, and an indication providing module 226. In the example illustrated in FIG. 2, modules 224 and 226 may execute internal to auxiliary TEE 132Z and be isolated from other portions of host device. In other examples, modules 224 and 226 may execute external to the auxiliary TEE and may be executed by the auxiliary device 120Z, by host device 120A, by another host device, or a combination thereof. In one example, program 135Z running in the auxiliary TEE may function as an agent (e.g., proxy agent) that can provide data of primary TEE to a service that is executing external to the auxiliary TEE 132Z. The external service may be a security service (e.g., Security Information Event Management (SIEM) service), observability service, monitoring service, other service or a combination thereof.

Data receiving module 222 may enable auxiliary device 120Z to access and receive data of the primary TEE over one or more of the trusted communication links. The data may be received from one or more sources and the sources may include the host memory (e.g., main memory), host processor (e.g., CPU), interconnects (e.g., PCIe bus), networks (e.g., internet packets), other computing resource of the host device, or a combination thereof. The data of the primary TEE may be received directly from the source (e.g., host memory) or may be copied to one or more data structures (e.g., queue or buffer) and processed by a processor before being received by data receiving module 222. The data structures may be stored at a location that is internal to the primary TEE (e.g., in the enclave), external to the primary TEE (e.g., buffer in host memory or auxiliary memory), other storage location, or a combination thereof. For example, data of primary TEE may be stored in host memory in an encrypted form and host processor may decrypt the data using a secret key and re-encrypt the data using a shared key (e.g., session key) that enables auxiliary device 120Z to decrypt the data.

Data receiving module 222 may receive the data of the primary TEE using a passive access mechanism, active access mechanism, or a combination thereof. The active access mechanism may involve accessing data from a source by transmitting a request for the data to the primary processor (e.g., CPU). The primary processor may respond to the request and transfer the data to data receiving module 222 of auxiliary device 120Z. The request may identify the data by indicating the location of the data, the type of data, name of the data, the owner of the data, other identification information, or a combination thereof. The passive access mechanism may involve accessing data from a source without transmitting a request for the data to the primary processor and may involve snooping or sniffing the data. Data receiving module 222 may store the data of the primary TEE in memory 124Z of auxiliary TEE as data 136.

Data 136 may represent the state of the one or more programs executing in the primary TEE and may be the same or similar to data 136A-Z of FIG. 1. Data 136 may include the data received from the primary TEE or may be transformed, aggregated, supplemented, enhanced, filtered, redacted, correlated, other operation, or a combination thereof before, during, or after being stored in memory 124Z. Data 136 may be associated with programs that are executed as one or more processes or threads in the primary TEE and the data 136 may be referred to as execution data, state data, runtime data, program data, TEE data, other term, or a combination thereof. Data 136 may include executable data (e.g., CPU instructions), non-executable data (e.g., information), or a combination thereof. Data 136 may include information of one or more data structures, configurations, credentials, events, functions, features, settings, versions, other aspect of the programs, or a combination thereof. In one example, data 136 may represent or indicate processor utilization (e.g., CPU utilization, processor cycles), memory usage (e.g., available memory, page misses), running processes (e.g., daemons or system services), open handles/descriptors (e.g., open files and sockets), events (e.g., security, system, or device events), crashes (e.g., segmentation faults), OS and kernel details, remote drives (e.g., mapped or mounted drives), process memory with injected code, memory scan, other information, or a combination thereof.

Detection module 224 may analyze data 136 derived from the primary TEE to detect whether the primary TEE or any program within the primary TEE has been compromised. As discussed above, the compromise may be based on an unauthorized change to the primary TEE and may include changes to executable data (e.g., processor instructions), non-executable data (e.g., user information), other data, or a combination thereof. The logic may analyze data 136 by performing operations that include searching, filtering, transforming, inspecting, comparing, other operation, or a combination thereof. The logic may be implemented as software logic (e.g., executable code of program 135Z), hardware logic (e.g., integrated circuits of auxiliary device 120Z), or a combination thereof.

The logic may detect the changes by analyzing the activity of the programs (e.g., behavioral profiling), the configuration of the programs (e.g., configuration checking), the content of the programs (e.g., comparing hash of data to hashes of known malware), other analysis, or a combination thereof. In one example, the logic may analyze data 136 to detect if malware exists in the primary TEE (i.e., malicious software present and/or running). In another example, the logic may analyze data 136 to detect if program 135A or primary TEE has had its configuration changed (e.g., encryption canceled, execution path modified). In yet another example, the logic may analyze data 136 to detect if program 135A or primary TEE has a vulnerability independent of whether it is or is not being exploited (e.g., detect an older version with known flaw).

Indication providing module 226 may enable auxiliary device 120Z to provide an indication that data is available or that a compromise has been detected. The indication may be a signal that is provided to a recipient and may be or include one or more messages, communications, events, interrupts, faults, exceptions, traps, other signal, or a combination thereof. The recipient may be a computing resource (e.g., program or device) of auxiliary device 120Z, host device 120A, a management device, other device, or a combination thereof. In one example, the indication may be a message that is sent to a security service that is executing external to the primary TEE and auxiliary TEE. The security service may manage one or more host devices and may be the same or similar to a Security Information Management (SIM) service, Security Event Management (SEM) service, a Security Information and Event Management (SIEM) service, an Extended Detection and Response (XDR) service, other service, or a combination thereof. In one example, providing the indication may involve the indication providing module 226 transferring the indication to the recipient. In another example, providing the indication may involve indication providing module 226 updating a shared data structure (e.g., queue, buffer, log, flag) that is accessible to the recipient to include the indication. The recipient may then access the shared data structure to receive the indication.

Figure 3:
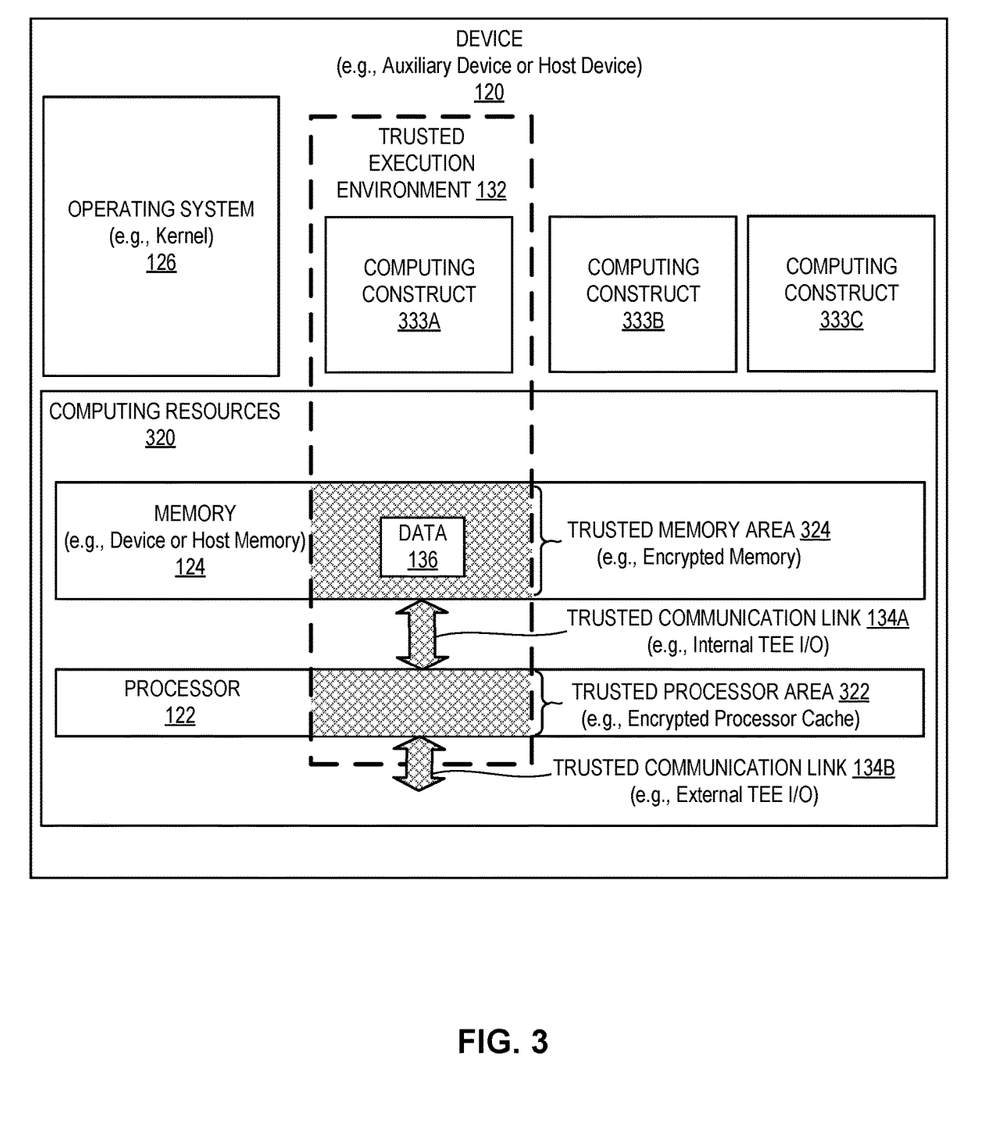
FIG. 3 depicts a block diagram of an example trusted execution environment, in accordance with one or more aspects of the present disclosure.

FIG. 3 depicts an example of a trusted execution environment 132 within a device 120, in accordance with an embodiment of the present disclosure. In one example, device 120 may be the same as host device 120A and the trusted execution environment 132 may be the same as primary trusted execution environment 132A. In another example, device 120 may be the same as auxiliary device 120Z and trusted execution environment 132 may be the same as auxiliary trusted execution environment 132Z. In either example, device 120 may include computing resources 320, a trusted execution environment 132, an operating system 126, and one or more computing constructs 333A-C. It should be noted that other architectures for device 120 are possible, and that the implementations of the computing device utilizing embodiments of the disclosure are not necessarily limited to the specific architecture depicted.

Computing resources 320 may include a combination of hardware and software that are used to perform computing tasks for device 120. Computing resources 320 may include one or more processing devices, data storage devices, Input/Output devices, programs (e.g., firmware), other aspects, or a combination thereof. One or more devices of the computing resources 320 may be combined or consolidated into one or more physical devices or may partially or completely emulated as a virtual device or virtual machine. In the example in FIG. 2, computing resources 320 may include memory 124 and processor 122.

Memory 124 may include any data storage device that is capable of storing data and may include physical memory devices. Memory 124 may be the same or similar to memory 124A or memory 124Z of FIG. 1. The physical memory devices may include volatile memory devices (e.g., non-persistent memory, Dynamic Random Access Memory (DRAM), Static Random Access Memory (SRAM)), non-volatile memory devices (e.g., Non-Volatile Random Access Memory (NVRAM), Persistent Memory (PMEM)), other types of memory devices, or a combination thereof.

Memory 124 may be capable of storing data 136 associated with one or more of the computing constructs 333A-C. In one example, data of computing construct 333A may be received from a device that is internal or external to device 120. The data may be encrypted using a cryptographic key that was provided (e.g., determined, derived, generated, or assigned) by device 120 or by a different computing device. The received data may be decrypted using the same cryptographic key or a derivative of the cryptographic key and the decrypted data may be loaded into the trusted execution environment 132 (as shown by data 136) before, during or after being re-encrypted.

Processor 122 may be communicably coupled to memory 124 and be capable of executing instructions encoding arithmetic, logical, or I/O operations. Processor 122 may be the same as processor 122A or the same as processor 122Z of FIG. 1. Processor 122 may be or include one or more general processors, Central Processing Units (CPUs), Graphical Processing Units (GPUs), Data Processing Units (DPUs), Digital Signal Processor (DSP), Application Specific Integrated Circuits (ASICs), secure cryptoprocessors, Secure Elements (SE), Hardware Security Module (HSM), Trusted Platform Module (TPM), other processing unit, or a combination thereof. Processor 122 may be a single core processor, which may be capable of executing one instruction at a time (e.g., single pipeline of instructions) or a multi-core processor, which may simultaneously execute multiple instructions. Processor 122 may interact with memory 124 and provide one or more features defined by or offered by trusted systems, trusted computing, trusted platform module (TPM), hardware security module (HSM), secure element (SE), other features, or a combination thereof.

Processor 122 may establish one or more trusted execution environments 132 across multiple hardware devices of computing resources 320 (e.g., processor and memory devices). Processor 122 may include instructions (e.g., opcodes) to initiate, configure, and maintain the trusted execution environments. In one example, processor 122 may establish trusted execution environment 132 using hardware technology from Intel® (e.g., Software Guard eXtensions® (SGX), Trusted Domain Extensions® (TDX)), AMD® (e.g., Secure Encrypted Virtualization® (SEV), Secure Memory Encryption (SME, SME-ES), ARM® (e.g., TrustZone®, Confidential Compute Architecture (CCA)), IBM (e.g., PEF), RISC-V Sanctum, other technology, or a combination thereof.

Trusted execution environment 132 may be a security enhanced area in device 120 that may guard the data of a computing construct 333A from being accessed by other computing constructs on device 120. Trusted execution environment 132 may enhance security by enhancing confidentiality (e.g., reducing unauthorized access), integrity (e.g., reduce unauthorized modifications), non-repudiation (e.g., action association), availability (e.g., ensure authorized access), other aspect of data security (e.g., information security, digital security), or a combination thereof. Trusted execution environment 132 may be the same or similar to a trust domain, trust zone, keep, enclave, other term, or a combination hereof. Trusted execution environment 132 may protect data 136 while data 136 is in use (e.g., processed by processor 122), is in motion (e.g., transmitted over network 140), is at rest (e.g., stored in persistent storage device 140), or a combinational thereof. Trusted execution environment 132 may isolate data of at least one process executed in trusted execution environment 132 from processes executing external to the trusted execution environment by storing the data 136 in a trusted memory area 324.

Trusted memory area 324 may be an area of memory 124 that is associated with trusted execution environment 132. As shown in FIG. 2, trusted memory area 324 may be a part of trusted execution environment 132 and may store data 136 of computing construct 333A in an encrypted form. Data 136 may be encrypted and decrypted by hardware devices (e.g., processor 122) using cryptographic input that includes one or more cryptographic keys. In one example, the cryptographic keys may be accessible to the hardware devices (e.g., processor 122) and may be inaccessible to operating system level processes executed by the hardware device. In another example, the cryptographic keys may be accessible to hardware devices and one or more computing constructs, such as, the computing construct associated with the trusted execution environment (e.g., computing construct 133A). In either example, the encryption and decryption performed by the hardware device may be referred to as hardware based encryption, hardware level encryption, hardware assisted encryption, hardware enforced encryption, process transparent encryption, virtual machine transparent encryption, container transparent encryption, other term, or a combination thereof.

Trusted memory area 324 may include a portion of memory that is referred to as an encrypted memory area. The encrypted memory area may be a contiguous or non-contiguous portion of virtual memory, logical memory, physical memory, other memory abstraction, or a combination thereof. The encrypted memory area may correspond to or be mapped to a portion of primary storage (e.g., main memory), auxiliary devices (e.g., device memory or device processor), persistent storage device (e.g., solid state storage), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area. In one example, the encrypted memory area may be the same or similar to curtained memory, an enclave, a keep, a trust domain, other term, or a combination thereof.

Trusted processor area 322 may be a portion of processor 122 that is associated with computing construct 333A and isolates data of one or more computing processes from being accessed or modified by another computing process. Trusted processor area 322 may include a portion of processor 122 that stores the data (e.g., processor cache and registers), a portion of processor 122 that executes the data (e.g., processor cores), or a combination thereof. Trusted processor area 322 may store the data in an encrypted form or in a decrypted form when it is present on the processor and in either example, the data of the computing construct may be isolated and protected. The data may be isolated and protected from being accessed or modified by other processes via the design of the processor and encryption may not be required to ensure isolation of the data when the data is within the processor or within a processor core. The data in trusted processor area 322 may be transmitted to other hardware devices using trusted communication links 134A-B.

Trusted communication links 134A-B may enable the data of trusted execution environment 132 to be transmitted between hardware devices in a security enhanced manner. Trusted communication links 134A-B may be the same or similar to trusted communication link 134 of FIG. 1. The data may be transmitted over one or more system interconnects, buses, networks, or other communication links in an encrypted or partially encrypted form. As shown in FIG. 2, trusted communication link 134A may enable the data to be transmitted internal to trusted execution environment 132 and between trusted processor area 322 and trusted memory area 324. Trusted communication link 134B may enable the data to be transmitted external to trusted execution environment 132 to one or more other devices (e.g., a peripheral device).

Figure 4:
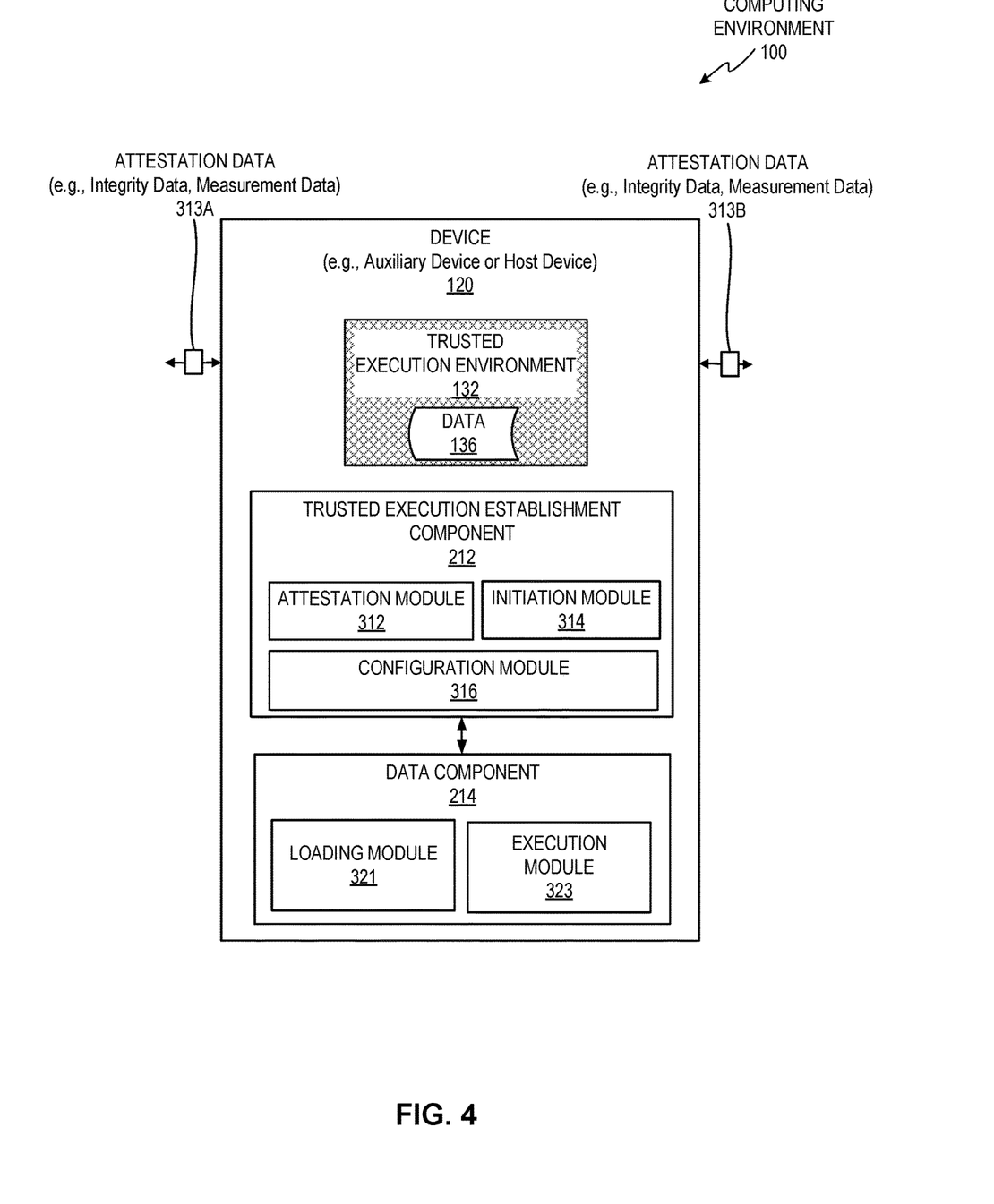
FIG. 4 depicts a block diagram of example components and modules for establishing the trusted execution environment of FIG. 3, in accordance with one or more aspects of the present disclosure.

FIG. 4 depicts a block diagram illustrating portions of computing environment 100 and how attestation is used to establish a trusted execution environment 132 within device 120. As discussed above, device 120 may be host device 120A and the attestation may be used to establish primary trusted execution environment 132A or device 120 may be auxiliary device 120Z and the attestation may be used to establish auxiliary trusted execution environment 132Z. In either example, device 120 may include a trusted execution establishment component 212 and a data component 214. The components and modules discussed herein may be performed by any portion of device 120. For example, one or more of the components or modules discussed below may be performed by processor circuitry, processor firmware, a driver, a kernel, an operating system, an application, other computing resource, or a combination thereof. More or less components or modules may be included without loss of generality. For example, two or more of the components may be combined into a single component, or features of a component may be divided into two or more components. In one implementation, one or more of the components may reside on different devices.

Trusted execution establishment component 212 may enable device 120 to establish one or more trusted execution environments 132 in device 120. Establishing a trusted execution environment may involve creating a new trusted execution environment or updating an existing trusted execution environment. Each of the one or more trusted execution environments may be associated with a set of one or more computing processes and may store and execute data of the set of computing processes. In one example, trusted execution establishment component 212 may include an attestation module 312, an initiation module 314, and a configuration module 316.

Attestation module 312 may enable device 120 to perform an attestation to verify the integrity of device 120 (e.g., integrity of computing resources 320, operating system 126, and/or processor 122). Attestation may enable a trusting resource (e.g., program) to check the capabilities of a trusted resource (e.g., processor 122 of device 120) and to detect unauthorized changes to programs, hardware devices, other portions of computing resources, or a combination thereof. The unauthorized changes may be the result of malicious, defective, or accidental actions by a program or hardware device.

The attestation may involve performing local attestation, remote attestation, or a combination thereof. Local attestation may involve enabling a program executed locally on device 120 to verify the integrity of device 120. Remote attestation may involve enabling a program executed remotely by a different device (e.g., user device 110) to verify the integrity of device 120. The remote attestation may be performed non-anonymously by disclosing data that uniquely identifies device 120 or anonymously without uniquely identifying device 120 (e.g., Direct Anonymous Attestation (DAA)). In either example, attestation module 312 may perform one or more attestation operations to determine attestation data 136A-B and may transmit attestation data 136A-B to the programs executing on the local or remote devices for verification.

Attestation data 313A-B may be based on the configuration of device 120 and may represent the capabilities of the computing resources, trusted execution environment, executable code, or a combination thereof. Attestation data obtained or generated by the computing resources (e.g., processor, memory, firmware, BIOS) may be the same or similar to integrity data (e.g., hash or signature of executable code), identification data (e.g., processor model or instance), cryptographic data (e.g., signature keys, endorsement keys, session keys, encryption or decryption keys, authentication keys), measurement data, report data, configuration data, settings data, other data, or a combination thereof. In one example, determining the attestation data may involve attestation chaining in which attestation data of different portions of device 120 may be combined before, during, or after being obtained. This may involve determining attestation data for one or more layers of the device 120 and the layers may correspond to hardware device layer (e.g., hardware platform attestation data), program layer (e.g, code attestation data), other layer, or a combination thereof.

The program that receives the attestation data may use the attestation data to verify the capabilities and behavior of device 120. The program may execute a verification function to verify the device 120 in view of the attestation data. The verification function may take as input the attestation data and provide output that indicates whether the device 120 is verified (e.g., trusted). In one example, the attestation data may include integrity data (e.g., a message authentication code (MAC)) and the verification function may analyze a portion of attestation data to generate validation data. The verification function may then compare the received integrity data with the generated validation data to perform the attestation (e.g., compare received MAC with generated MAC).

Attestation module 312 may perform operations before, during, or after trusted execution environment 132 is established on device 120 and may provide attestation data that is specific to the initiation, configuration, or execution of the trusted execution environment 132. In one example, attestation may involve performing a key exchange, establish hardware root of trust, and/or provide measurement and configuration values of trusted execution environment 132.

Initiation module 314 may enable device 120 to initiate the configuration of a trusted execution environment before, during, or after the execution of attestation module 312. Initiation module 314 may execute one or more instructions recognized by the processor (e.g., opcodes for ARM CCA/TrustZone, Intel TDX/SGX, or AMD SEV). The instructions may be called by a program associated with an application, kernel, operating system, hypervisor, bootloader, Basic Input Output Services (BIOS), hardware adapter, other entity, or a combination thereof. In one example, a program that will execute in the trusted execution environment may initiate the creation of the trusted execution environment. In another example, a program may initiate the creation of the trusted execution environment and the trusted execution environment may be used for executing another program. In either example, after the trusted execution environment is initiated it may be configured by configuration module 316.

Configuration module 316 may enable device 120 to configure a trusted execution environment to store or execute data of a computing process (e.g., application or virtual machine). Configuration module 316 may configure the trusted execution environment in view of configuration data provided by a process initiating or using the trusted execution environment, by a processor, storage device, other portion of device 120, or a combination thereof. The configuration data may be provided as input before, during, or after the trusted execution environment is initiated, created, or updated. As discussed above, a trusted execution environment may include a trusted memory area, a trusted processor area, trusted communication link, or a combination thereof and the configuration data may include data for configuring one or more of these. For example, configuration data may include computing construct data (e.g., virtual machine identifier (VMID), processes identifier (PID)), storage data (e.g., storage size or location), cryptographic data (e.g., encryption key, decryption key, seed, salt, nonce), other data, or a combination thereof. One or more of these may be configured or customize and associated with the trusted execution environment for the computing process. In one example, the trusted execution environment may include an encrypted memory area and the configuration data may indicate a size of the encrypted memory area that will be allocated for the trusted execution environment (e.g., size of memory for a trusted memory area).

Configuration module 316 may configure different aspects of the trusted execution environment to use different cryptographic systems. The different cryptographic systems may use different cryptographic functions, cryptographic settings, cryptographic keys, cryptographic inputs, other cryptographic data, or a combination thereof. In one example, data of a computing process that will be executed by the trusted execution environment 132 may be encrypted using a first cryptographic system (e.g., encrypted using a location independent transport key) when loaded by the processor and may be encrypted using a second cryptographic system (e.g., encrypted using a location dependent storage key) when stored in the encrypted storage. This may be advantageous because the data may be more vulnerable to attack when it is stored on a removable storage device (e.g., memory module or persistent storage device) then when it is transferred over the system bus and therefore different cryptographic techniques may be used.

Data component 214 may enable device 120 to load data 136 of a computing process (e.g., VM) into trusted execution environment 132 to enhance the confidentiality and integrity of the processing of data. Data 136 may include data of one or more programs and include executable code (e.g., machine instructions), non-executable data (e.g., configuration data, parameter values, or settings), other data, or a combination thereof. In one example, data component 214 may include a loading module 321 and an execution module 323.

Loading module 321 may include instructions for loading data into trusted execution environment 132. Loading data 136 may involve copying data, moving data, updating data, modifying data, or other action affecting data 136. The process of loading data 136 may involve copying data into the trusted processor area from the trusted memory area, copying data into the trusted memory area from an untrusted area, other copy operation, or a combination thereof. Trusted execution environment 132 may store the data of the computing process in the trusted memory area and the loading may involve the processor receiving the data in an encrypted form over a bus from the trusted memory area. Trusted execution environment 132 may include or be associated with a particular portion of memory (e.g., specific range of addresses) and a particular portion of the processor (e.g, particular core) and the data that is loaded into trusted execution environment 132 may be accessible to the computing process and inaccessible to the kernel prior to the enabling.

Execution module 323 may enable device 120 to cause data 136 (e.g., executable code) to execute in the trusted execution environment 132. As discussed in regards to FIG. 3, device 120 may include an operating system 126 that manages the execution of multiple computing processes. Execution module 323 may be a part of operating system 126 or interact with operating system 126 to initiate the execution of executable code as a computing process. Although the operating system may not have access to a decrypted version of the data in trusted execution environment 132, it may be able to manage when the computing process executes and the operations it performs.

Figure 5:
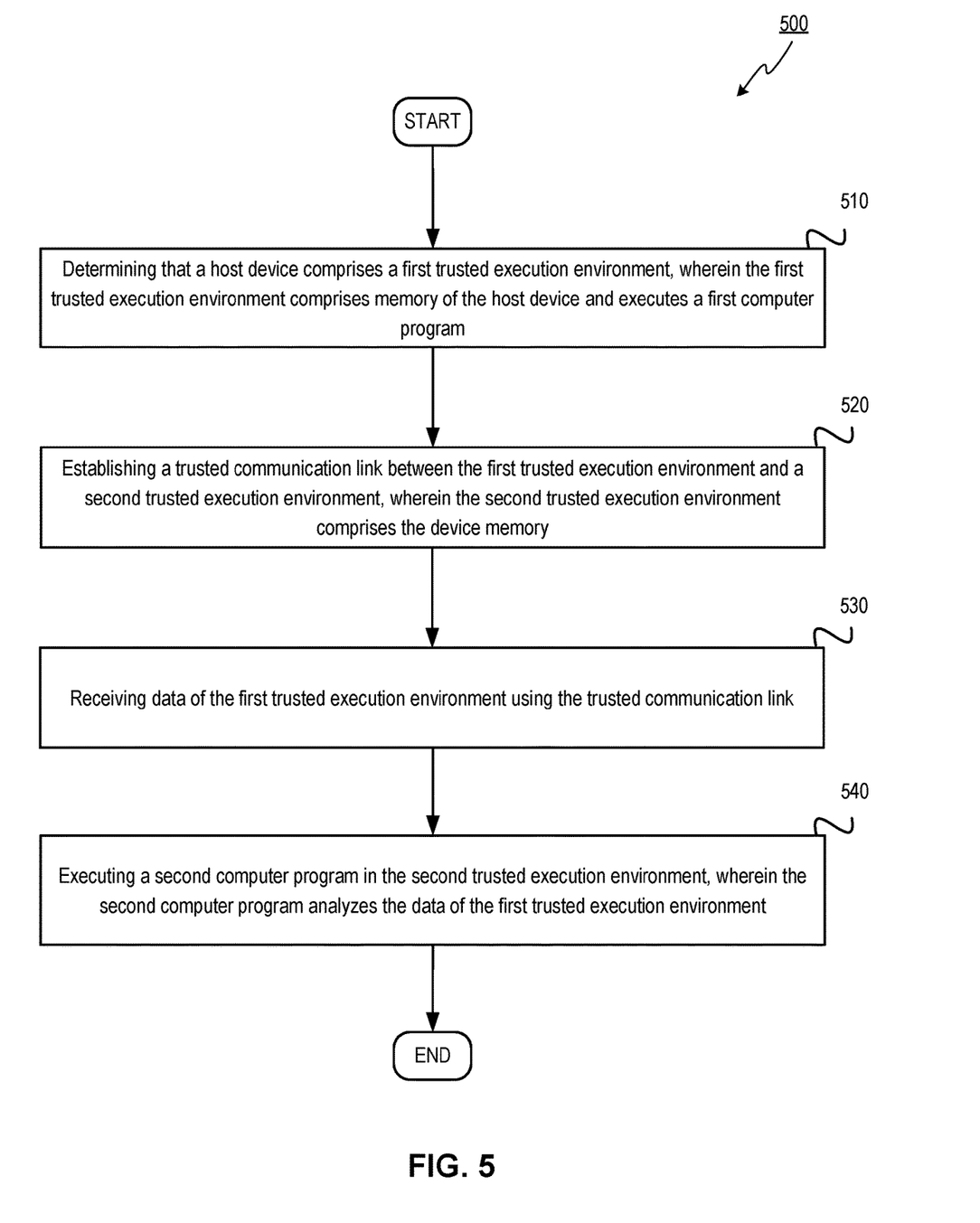
FIG. 5 depicts a flow chart of a method performed by an auxiliary device to access and analyze portions of a confidential computing environment, in accordance with one or more aspects of the present disclosure.

FIG. 5 is a flow chart of a method 500 for accessing and analyzing data of a trusted execution environment, in accordance with some embodiments of the present disclosure. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Method 500 may be performed by processing logic of an auxiliary device 120Z, host device 120A, other device, or a combination thereof and may begin at operation 510.

At operation 510, the processing logic can determine that a host device comprises a first trusted execution environment that includes memory of the host device and executes a first computer program. The host device may include a host operating system that manages computing resources of the host device and the first trusted execution environment can include data that is encrypted and inaccessible to the host operating system. In one example, the host device may include a Central Processing Unit (CPU) and a Data Processing Unit (DPU). The DPU may include a processor, device memory, and the processing logic. The CPU may establish the first trusted execution environment and the DPU may establish the second trusted execution environment. The CPU may execute the first computer program in the first trusted execution environment and the DPU may execute a second computer program to monitor execution of the first program.

At operation 520, the processing logic can establish a trusted communication link between the first trusted execution environment and the second trusted execution environment. The second trusted execution environment may include the device memory (e.g., a portion of device memory). The processing logic may further establish a composite trusted execution environment that includes the first trusted execution environment, the second trusted execution environment, and the trusted communication link. In one example, the processing logic may be included in an auxiliary device that comprises a processor, device memory, and one or more hardware accelerators. The processing logic may extend a Trusted Computing Base (TCB) that includes a host processor (e.g., CPU) to include the processor and the one or more hardware accelerators of the auxiliary device.

At operation 530, the processing logic can receive data of the first trusted execution environment using the trusted communication link. The data may represent the state of the one or more programs executing in the first trusted execution environment (e.g., primary TEE). The data may include executable data (e.g., CPU instructions), non-executable data (e.g., information), or a combination thereof. Data may be transformed, aggregated, supplemented, enhanced, filtered, redacted, correlated, other operation, or a combination thereof before, during, or after being received. In one example, the received data may include information of one or more data structures, configurations, credentials, events, functions, features, settings, or versions other aspect of the programs, or a combination thereof.

At operation 540, the processing logic can execute the second computer program in the second trusted execution environment and the second computer program may analyze the data of the first trusted execution environment. In one example, the first computer program and the second computer program may be provided by a cloud consumer in an encrypted form and may be inaccessible to a host operating system that is maintained, supported, or operated by a cloud provider. In another example, the first computer program may be provided by the cloud consumer and the second computer program may be provided by the cloud consumer but may be verified by the cloud consumer before, during, or after it begins executing in the second trusted execution environment (e.g., attestation between consumer and provider). The processing logic may access data of the first computer program that is stored in the second trusted execution environment (e.g., the received data) and detect whether or not the first computer program is compromised. The processing logic may provide an indication that the first computer program executing in the first trusted execution environment is compromised. Responsive to executing the logic described herein above with references to operation 540, the method 500 may repeat or terminate.

Figure 6:
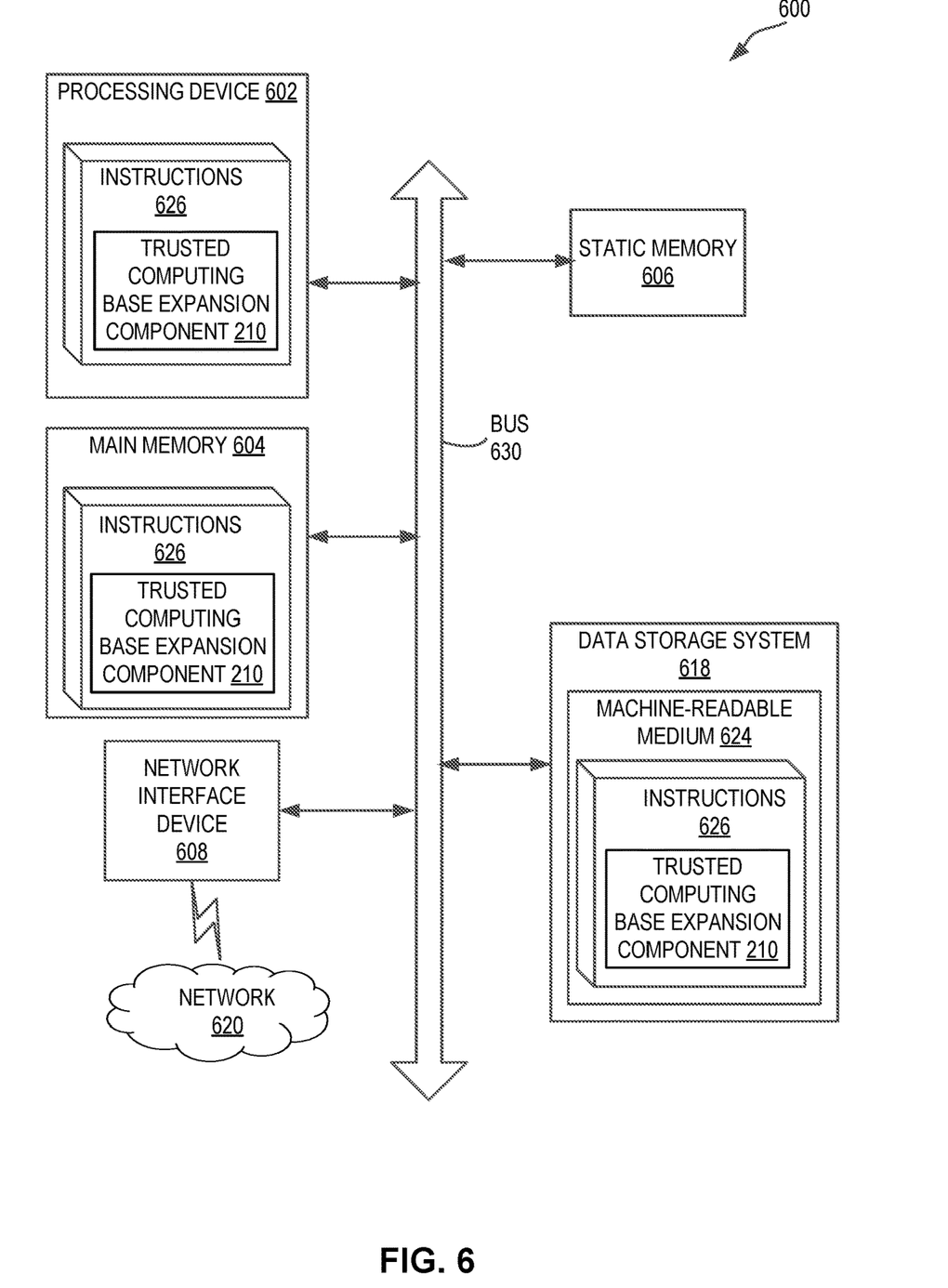
FIG. 6 depicts a block diagram of an example computing system operating in accordance with the examples of the present disclosure.

FIG. 6 illustrates an example machine of a computer system 600 within which a set of instructions, for causing the machine to perform any one or more of the methodologies discussed herein, can be executed. In some embodiments, the computer system 600 can be a computing device that includes a processor with a cache controller, a memory controller, or combination thereof. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602 (e.g., Processor 122), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to memory 124A of FIG. 1.

In one embodiment, the instructions 626 include instructions to implement functionality corresponding to the trusted computing base expansion component 220 of FIG. 2. While the machine-readable storage medium 624 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a host device comprising a data processing unit (DPU), the DPU comprising:
   a device memory; and
   a processor, communicably coupled to the device memory, to perform operations comprising:
      determining that the host device comprises a first trusted execution environment established by a central processing unit (CPU) of the host device, wherein the first trusted execution environment comprises memory of the host device and the CPU executes a first computer program in the first trusted execution environment;
      establishing a trusted communication link between the first trusted execution environment and a second trusted execution environment, wherein the second trusted execution environment is established by the DPU;
      receiving data of the first trusted execution environment using the trusted communication link; and
      executing a second computer program in the second trusted execution environment to monitor execution of the first computer program, wherein the second computer program analyzes the data of the first trusted execution environment.

2. The system of claim 1, wherein the host device comprises a host operating system that manages computing resources of the host device, and wherein the first trusted execution environment and the second trusted execution environment each comprise data that is encrypted and inaccessible to the host operating system.

3. The system of claim 1, wherein the operations further comprise:
   accessing, by the processor, data of the first computer program that is stored in the second trusted execution environment;
   detecting, by the processor, that the first computer program is compromised; and
   providing, by the processor, an indication that the first computer program executing in the first trusted execution environment is compromised.

4. The system of claim 1, further comprising an auxiliary device that comprises the processor, the device memory, and one or more hardware accelerators, wherein the operations further comprise, extending a Trusted Computing Base (TCB) that comprises a host processor to further comprise the processor and the one or more hardware accelerators.

5. The system of claim 1, wherein the operations further comprise, establishing a composite trusted execution environment that includes the first trusted execution environment comprising a host processor and the memory of the host device and further includes the second trusted execution environment that comprises the processor and the device memory.

6. The system of claim 1, wherein the first computer program and the second computer program are provided by a cloud consumer in an encrypted form and are inaccessible to a host operating system operated by a cloud provider.

7. A method comprising:
 determining, by an auxiliary processor comprising a data processing unit (DPU), that a host device comprises a first trusted execution environment established by a central processing unit (CPU) of a primary processor, wherein the first trusted execution environment comprises a host memory of the host device and the CPU executes a first computer program in the first trusted execution environment;
 establishing, by the auxiliary processor, a trusted communication link between the first trusted execution environment and a second trusted execution environment, wherein the second trusted execution environment is established by the DPU of the auxiliary processor;
 receiving, by the auxiliary processor, data of the first trusted execution environment using the trusted communication link; and
 executing, by the auxiliary processor, a second computer program in the second trusted execution environment to monitor execution of the first computer program, wherein the second computer program analyzes the data of the first trusted execution environment.

8. The method of claim 7, wherein the host device comprises a host operating system that manages computing resources of the host device, and wherein the first trusted execution environment and the second trusted execution environment each comprise data that is encrypted and inaccessible to the host operating system.

9. The method of claim 7, wherein the first computer program and the second computer program are provided by a user device of a cloud consumer in an encrypted form and are inaccessible to a host operating system provided by a cloud provider.

10. The method of claim 7, further comprising:
 accessing, by the auxiliary processor, data of the first computer program that is stored in the second trusted execution environment;
 detecting, by the auxiliary processor, that the first computer program is compromised; and
 providing, by the auxiliary processor, an indication that the first computer program executing in the first trusted execution environment is compromised.

11. The method of claim 10, further comprising, extending a Trusted Computing Base (TCB) that comprises the primary processor and the host memory to further comprise the auxiliary processor and the trusted communication link.

12. The method of claim 10, further comprising, establishing a composite trusted execution environment that includes the first trusted execution environment comprising the primary processor and includes the second trusted execution environment that comprises the auxiliary processor.

13. A non-transitory machine-readable storage medium storing instructions which, when executed, cause an auxiliary processor comprising a data processing unit (DPU) to perform operations comprising:
 determining that a host device comprises a first trusted execution environment established by a central processing unit (CPU) of a primary processor, wherein the first trusted execution environment comprises a host memory of the host device and the CPU executes a first computer program in the first trusted execution environment;
 establishing a trusted communication link between the first trusted execution environment and a second trusted execution environment, wherein the second trusted execution environment is established by the DPU of the auxiliary processor;
 receiving data of the first trusted execution environment using the trusted communication link; and
 executing a second computer program in the second trusted execution environment to monitor execution of the first computer program, wherein the second computer program analyzes the data of the first trusted execution environment.

14. The non-transitory machine-readable storage medium of claim 13, wherein the host device comprises a host operating system that manages computing resources of the host device, and wherein the first trusted execution environment and the second trusted execution environment comprise data that is encrypted and inaccessible to the host operating system.

15. The non-transitory machine-readable storage medium of claim 13, wherein the first computer program and the second computer program are provided by a user device of a cloud consumer in an encrypted form and are inaccessible to a host operating system provided by a cloud provider.

16. The non-transitory machine-readable storage medium of claim 13, wherein the operations further comprise:
 accessing data of the first computer program that is stored in the second trusted execution environment;
 detecting that the first computer program is compromised; and
 providing an indication that the first computer program executing in the first trusted execution environment is compromised.

17. The non-transitory machine-readable storage medium of claim 13, wherein the operations further comprise extending a Trusted Computing Base (TCB) that comprises the primary processor and the host memory to further comprise the auxiliary processor and the trusted communication link.

18. The non-transitory machine-readable storage medium of claim 13, wherein the operations further comprise establishing a composite trusted execution environment that includes the first trusted execution environment comprising the primary processor and includes the second trusted execution environment that comprises the auxiliary processor.

* * * * *